United States Patent [11] 3,575,639

[72] Inventors Richard F. Shaw
 North Attleboro, Mass.;
 Fred E. Nelson, Cranston, R.I.
[21] Appl. No. 817,756
[22] Filed Apr. 21, 1969
[45] Patented Apr. 20, 1971
[73] Assignee Texas Instruments, Incorporated
 Dallas, Tex.

[54] TIME DELAY CIRCUIT ADAPTED FOR USE IN A POWER CONTROL SYSTEM
6 Claims, 6 Drawing Figs.
[52] U.S. Cl. ................................................. 317/141S, 317/142TD
[51] Int. Cl. ................................................. H01g 47/18
[50] Field of Search .......................................... 317/148.5 (T.D), 142, 137, 139

[56] References Cited
UNITED STATES PATENTS
| | | | |
|---|---|---|---|
| 3,282,631 | 11/1966 | Mosinski | 307/293 |
| 3,473,054 | 10/1969 | Wieczorek | 307/293 |
| 3,436,607 | 4/1969 | Yagusic | 317/142 |
| 3,355,632 | 11/1967 | Wallentowitz | 317/142 |

Primary Examiner—William M. Shoop, Jr.
Assistant Examiner—Harry E. Moose, Jr.
Attorneys—Harold Levine, Edward J. Connors, Jr., John A. Haug, James P. McAndrews and Gerald B. Epstein ABSTRACT: The disclosed circuit includes an interconnected resistor capacitor time delay network having a preselected time constant. A pedestal network for establishing a preset voltage across the capacitor is coupled to the time delay network to establish the preset voltage across the capacitor at the initiation of a charging cycle. The capacitor is charged in response to the initiation of a control signal to a preselected voltage level. A voltage sensitive switch means is coupled to the capacitor, and is maintained nonconductive by an adjustable bias network until the preselected voltage level appears across the capacitor whereupon the voltage sensitive switch means is rendered conductive so as to provide a discharge path for the capacitor. The time interval required for charging the capacitor to the preselected voltage level is dependent upon the voltage set by the bias network. A current responsive switch means is coupled to the voltage sensitive means and to the capacitor discharge path in order to provide an output signal in response to the discharge of the capacitor. Control of the conduction of an output switch means coupled to the load is effected by the output signal, thereby controlling the power supplied to the load.

PATENTED APR 20 1971

Inventors:
Richard F. Shaw,
Fred E. Nelson,
by Gerald B. Epstein Att'y.

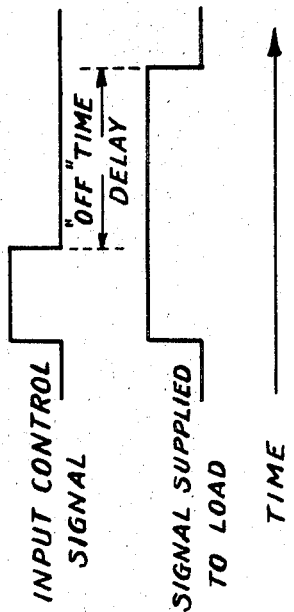
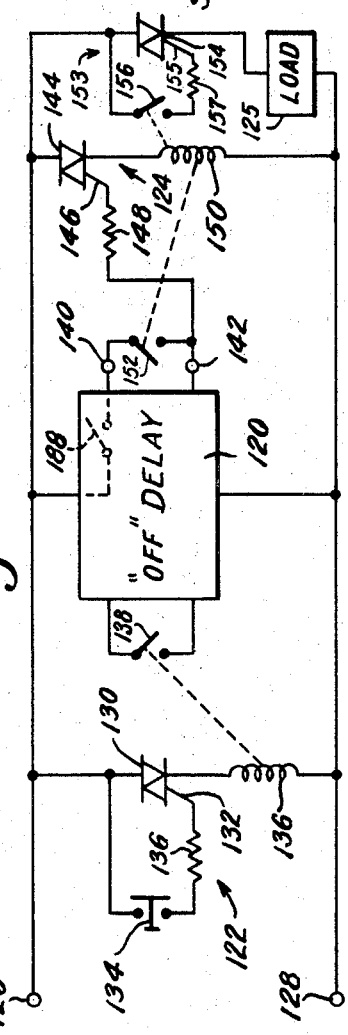
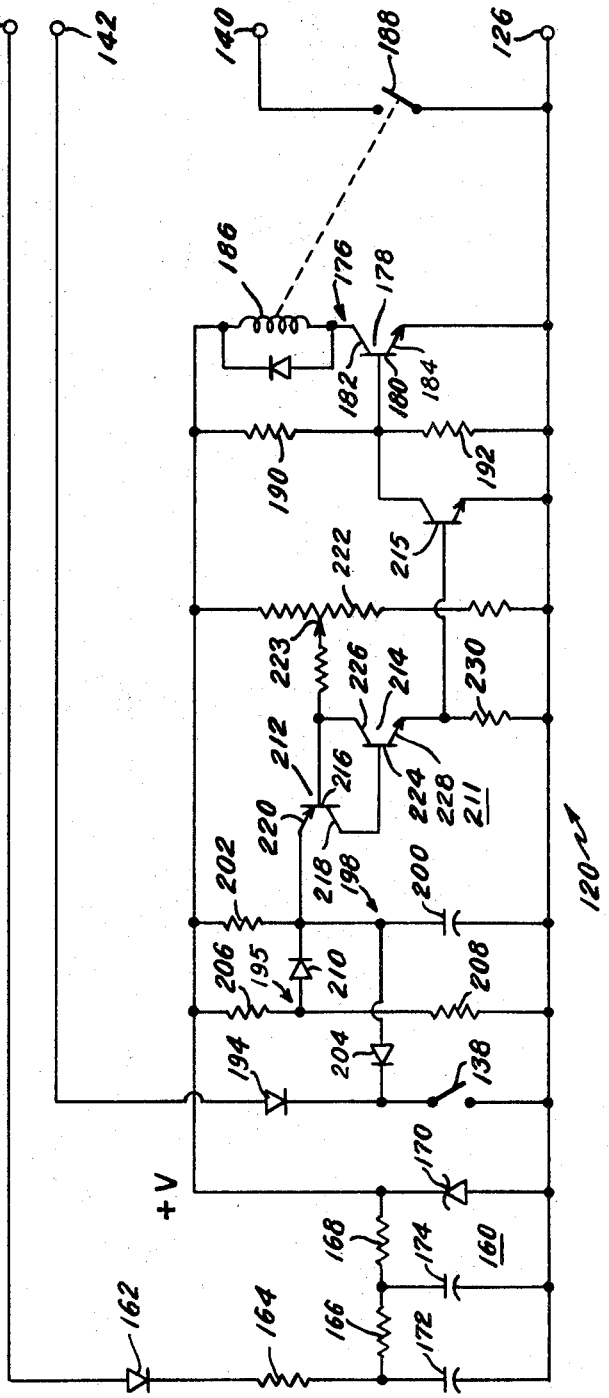

TIME DELAY CIRCUIT ADAPTED FOR USE IN A POWER CONTROL SYSTEM

The present invention relates generally to time delay circuits and more particularly to time delay circuits for providing a preselected time delay between the initiation of a control signal and an output signal controlling the power supplied to a load.

In various industrial power control systems, such as those controlling the power being supplied to a load, such as a solenoid, in response to an input source, a relatively large number of sequencing operations may be effected through a plurality of relay branches in the power control system. In such systems it is often desirable to provide a preselected time delay between energization or deenergization of the system in response to an input control signal and the output control signal controlling the power to the load. For example, in certain instances, peripheral equipment may be utilized in conjunction with the load for effecting colling thereof and may require energization prior to energization of the load so as to assure that proper cooling is being effected before the load is supplied with power. Similarly, in many instances it may be desirable to provide a preselected time delay between initiation of a control signal for disrupting the power being supplied to the load and the output signal which effects disruption of the power to the load.

Problems often arise in providing such a time delay network due to the different requirements for the time delay network as compared with those of the power control system itself. Such problems may arise from the attempt to effect suitable electrical interfacing as well as mechanical interfacing between the input source, the multibranch power control system, and the load. This type of electrical and mechanical interface problem becomes particularly apparent, when a miniaturized power control system is utilized, which is relatively small in physical size, but yet able to handle relatively large power levels. In addition, presently available time delay circuits, which may be suitable for use in such systems, often represent a considerable power drain on the overall power control system which is, of course, quite undesirable since the time delay circuit often is operated on a standby basis, whereby it is maintained in an energized state so that it may be rendered operative, but yet may not be continually utilized. In addition, when a miniaturized power control system and a miniaturized time delay circuit are utilized the problem of repeat accuracy of the timing network may arise, since it is difficult to arrange the timing capacitor to repeatedly discharge completely or return to the same voltage level upon completion of the discharge cycle. Thus, the timing capacitor may not always require the exact same interval for charging since it may have previously been charged from a different voltage level. When a miniaturized circuit of this type is provided, it may become difficult to provide suitable means for assuring return of the charging capacitor to a desired voltage level subsequent to its discharge cycle, which leads to a significant problem in repeat accuracy of the timing circuit.

Accordingly, it is an object of the present invention to provide an improved timer circuit for use with a power control system.

It is another object of the present invention to provide an improved miniaturized time delay circuit, requiring a relatively low power drain, for use in a power control system.

It is a further object of the present invention to provide an improved miniaturized time delay circuit, which is mechanically and electrically compatible with a miniaturized power control system, for effecting a desired time delay between the initiation of the control signal and an output signal for supplying power to a load.

It is still a further object of the present invention to provide an improved time delay circuit for use with a power control system, which is electrically and mechanically compatible with the power control system, is extremely small in size, requires a minimal power level for energization, and is durable in use.

Various additional features and advantages of the present invention will be readily apparent from the following detailed description and the accompanying drawings wherein:

FIG. 4 is a partially diagrammatic electrical schematic circuit diagram of a power control system including an OFF delay circuit;

FIG. 5 is an electrical schematic circuit diagram of the OFF delay circuit illustrated in FIG. 4; and FIG. 6 is a diagram illustrating the operation of the OFF delay circuit illustrated in FIG. 5.

Figure 1:
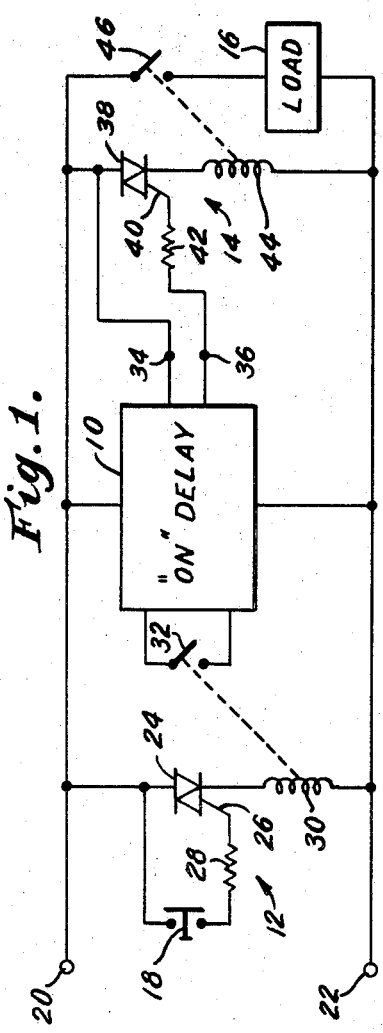
FIG. 1 is a partially diagrammatic electrical schematic circuit diagram of a power control system including an ON delay circuit.

Referring generally to the drawings and particularly to FIG. 1 a power control system is illustrated including a time delay circuit 10 in accordance with the principles of the present invention. The power control system is generally similar to that illustrated and described in the applicant's copending application Ser. No. 817,757, filed Apr. 21, 1969 and assigned to the same assignee as the present application. The time delay circuit 10 is generally interconnected between input and output switches branches 12 and 14 respectively, only two of such branches being illustrated for the sake of simplicity. The power control system is adapted to control the power supplied to a load 16 in accordance with information supplied by an input source (not shown) which selectively energizes an input switch means 18 in the input switch branch 12. The power control system illustrated also includes a pair of AC power terminals 20 and 22 adapted to be connected to an AC power supply (not shown), such as a conventional 115 volt 60 Hz power source.

The input switch branch 12 generally includes an AC power switch 24, such as a triac, including a gate electrode 26 which is coupled to the input switch means 18 through a gate resistor 28, and further includes a selectively energizable relay coil 30 serially connected to the triac power terminals. Thus, when the input switch means 18 is closed so that a triggering signal is applied to the gate electrode 26 if the triac 24, the triac is rendered conductive and supplies an electrical signal through the relay coil 30.

The time delay circuit 10 is connected in parallel relationship with the input switch branch 12 and includes an input switch means 32, which in the illustrated embodiment, includes a pair of relay contacts operatively connected to the relay coil 30 so that energization of the relay coil 30 effects closure of the relay contacts 32, thereby supplying a control signal to initiate operation of the time delay circuit 10. In operation, as subsequently explained in detail, after a preselected time delay an output signal is provided by the timer circuit 10 in response to the control signal, the output signal being supplied across a pair of output terminals 34, 36 of the time delay circuit. These terminals are coupled to the relay branch 14, which is generally similar to the relay branch 12 and also includes an AC power switch, such as a triac 38, having a gate electrode 40 which is coupled to the output terminal 36 through a gate resistor 42, while output terminal 34 is directly coupled to a triac, power terminal. In addition, a selectively energizable relay coil 44 is serially connected to the power terminals of the triac 38. Thus, when an output signal is provided by the time delay circuit 10 across the output terminals 34, 36, the gate electrode 40 of the triac 38 is supplied with a trigger signal and the triac is rendered conductive so that power is supplied across its power terminals to the relay coil 44. The relay coil 44 is coupled to a switch means 46, such as a pair of relay contacts 46. The switch means 46 is serially connected between the power supply and the load 16 so that upon energization of the relay coil 44 the switch means 46 is closed and power is supplied to the load 16.

Figure 2:
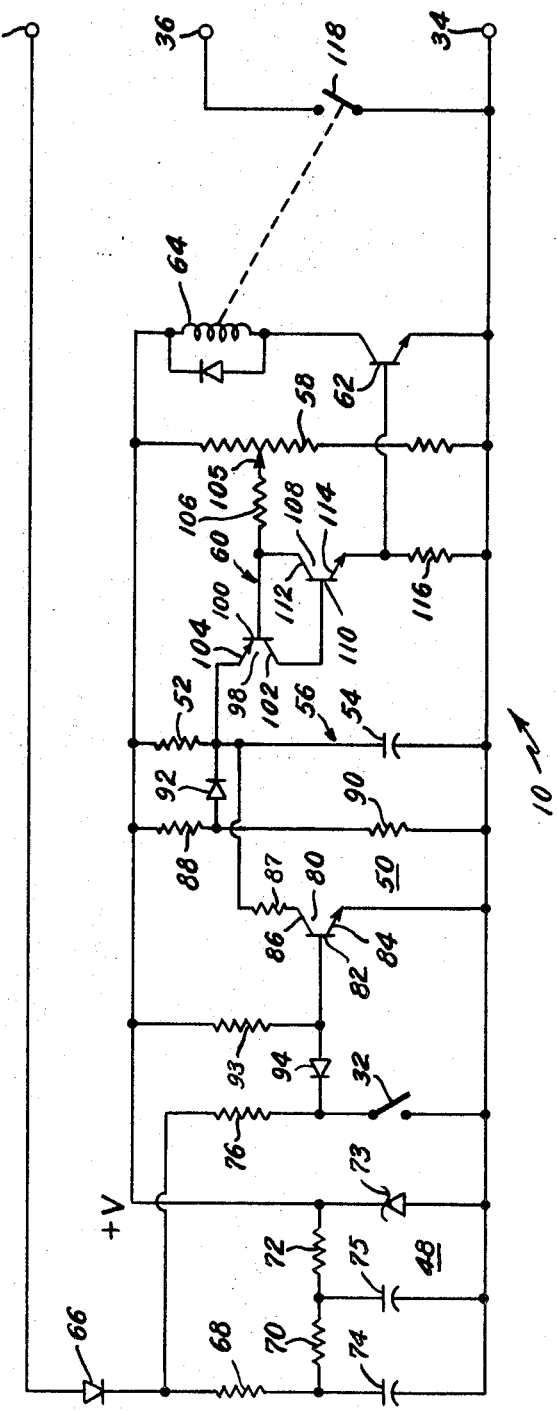
FIG. 2 is an electrical schematic circuit diagram of an ON delay circuit in accordance with the present invention.

Referring now in detail to FIG. 2, the ON delay circuit 10 is illustrated in detail. The ON delay circuit 10 generally includes a power supply network 48 for supplying half wave rectified power. A pedestal network 50 is coupled to the power supply network 48 and functions to establish a preset voltage across a parallel connected resistor 52 and capacitor 54 which comprises a time delay network 56. The time delay network 56 is also coupled to a potentiometer bias network 58, which is adjustable to a voltage level in excess of the preset voltage level provided by the pedestal network 50. In addition, a switch network 60 is coupled to the potentiometer 58 and to the time delay network 56. The switch network 60 is biased to a nonconductive state by the potentiometer 58, but is rendered conductive, when the preselected voltage level appears across the capacitor 54, and thereupon provides a discharge path for the capacitor 54. In addition, a switch energizing means 62 is coupled to the switch network 60 and is rendered conductive in response to conduction of the switch network 60. The switch energizing means 62 is also coupled to a selectively energizable switch means 64, which is energized in response to conduction of the switch energizing means 62 to cause an output signal to appear across the terminals 34, 36 thereby energizing the triac 38 (referring to FIG. 1). Operating power is supplied to the power supply network 48 through a rectifying diode 66 and through a plurality of serially connected voltage dropping resistors, 68, 70, and 72 to a voltage regulator diode 73, preferably comprising a Zener diode, which is biased by the rectifying diode 66 to develop a desired constant DC voltage reference signal across its terminals, as shown. Power supply network 48 also preferably includes parallel connected filter capacitors 74 and 75 connected across the Zener diode 73 in order to assure the provision of a substantially ripple-free DC reference voltage output signal at the output of the Zener diode 73.

The pedestal network 50, is coupled to the time delay network 56 in order to establish the preset initial voltage across the capacitor 54. Operation of the pedestal network is controlled by a normally conductive NPN inverting transistor 80 having a base 82, an emitter 84 and a collector 86. The transistor 80 remains conductive while switch 32 is open and is rendered nonconductive when switch 32 is closed. In this regard, the collector 86 of the transistor 80 is connected to the junction of resistor 52 and capacitor 54 through a resistor 87, as shown, and thus shunts the capacitor 54 to prevent charging of the capacitor from the DC reference potential, as long as switch 32 is open, which maintains transistor 80 in a conductive state, as previously explained. The preset voltage is established across capacitor 54 by a voltage divider configuration including a pair of serially connected resistors 88 and 90 having a common junction, which is coupled to the capacitor 54 through a diode 92. The resistor 88 is connected to the positive DC potential and thus charges capacitor 54 to the preset voltage level through diode 92, which becomes reversed biased, when this preset voltage level is established to prevent further charging through resistor 88. This present voltage level is established across the capacitor 54, when switch 32 is open, in order to achieve improved accuracy in the time interval required for charging the capacitor, since assurance is thereby provided that charging of the capacitor is initiated from the same initial voltage level when switch 32 is closed to initiate a charging and discharging cycle, as subsequently explained.

The conduction of transistor 80 is controlled by a bias resistor 93 which connects the base 83 to the positive DC potential, while the emitter 84 is coupled to the negative potential terminal of power supply network 48. In addition, an AC blocking diode 94 is provided which is connected to a current limiting resistor 76 and isolates the base 82 from the applied AC power. When switch 32 is closed, the base 82 and emitter 84 of transistor 80 are tied together and are both at almost the same voltage level. Consequently, there is an insufficient base-emitter bias to maintain transistor 80 conductive and it is rendered nonconductive. As a result, transistor 80 no longer shunts capacitor 54, a charging cycle is initiated and the capacitor 54 is permitted to be charged to the preselected voltage level through resistor 52. In this connection in accordance with an improved feature of the present invention, the preselected voltage level and thus the time interval required for charging the capacitor is controlled by the setting of potentiometer 58 which biases the switch means 60. The potentiometer 58 is coupled to the switch network 60, as shown, the functions to bias the switch network 60 to a nonconductive state until the preselected voltage level is established across capacitor 54. The switch network 60 includes a normally nonconductive PNP transistor 98 having a base 100, a collector 102, and an emitter 104. The adjustable tap 105 of the potentiometer 58 is coupled to the base 100 of transistor 98 through a voltage dropping resistor 106, and serves to maintain the base 100 reverse biased with respect to the emitter 104. In this regard the potentiometer 58 is set to a desired voltage level to maintain a positive voltage on the base 100 of PNP transistor 98, thereby maintaining the base-emitter junction reverse biased and the transistor 98 nonconductive. However, the capacitor 54 is coupled to the emitter 104, and, as the capacitor is charged, the voltage level established thereacross eventually exceeds that set by potentiometer 58 and causes the emitter 104 to become positive with respect to the base 100, thereby forward biasing the base-emitter junction rendering transistor 98 conductive, and providing a discharge path for capacitor 54 through transistor 98. In addition, it should be noted that the capacitor 54 is charged at a predetermined rate dependent upon the time constant of the time delay network 56. However, the time interval required for the preselected voltage level to be established across the capacitor 54 is controlled by the setting of adjustable tap 105 of potentiometer 58, since the transistor 98 becomes conductive and defines a discharge path for capacitor 54, when the voltage level established across the capacitor exceeds that set by potentiometer 58. Thus, the bias established across the switch means 60 is effective to control the time interval required for establishing the preselected voltage level across the capacitor 54. The switch transistor 98 is also connected to an NPN output transistor 108 having a base 110, a collector 112, and an emitter 114. The output transistor 108 is also normally nonconductive and is arranged with its base 110 connected to the collector 102 of switch transistor 98. Consequently, when a signal is applied to the base 110 as a result of conduction of transistor 98, the transistor 108 is energized. Thus, a charging cycle of capacitor 54 is initiated by closure of switch 32 with a preselected voltage level being established across the capacitor 54 in a predetermined time interval dependent upon the setting of potentiometer 58, and a discharge cycle is initiated when the preselected voltage level is established with a discharge path being defined by the transistors 98 and 108. In addition, a latch function is provided, associated with discharge of capacitor 54. In this regard as capacitor 54 discharges through the emitter-collector circuit of transistor 98, the voltage across capacitor 54 decreases. As the preset voltage level is reached, diode 92 which had become reversed biased when the preset voltage level was exceeded, becomes forward biased, and a latching signal sufficient to maintain transistor 98 in its conductive state and thus to maintain transistor 108 conductive, is supplied through resistor 88 and diode 92 to the emitter 104 of transistor 98. Thus, transistors 98 and 108 remain conductive subsequent to discharge of capacitor 54, but may be rendered nonconductive upon opening of switch 32 which, as previously explained, renders transistor 80 conductive, so that capacitor 54 immediately discharges therethrough to approximately 0 volts, while transistor 80 also shunts the charging signal, in the manner previously explained. In one preferred example, the preset voltage across capacitor 54 is 2.5 volts and the potentiometer 58 is set at a voltage level of approximately 10 volts so that the base-emitter junction of PNP transistor 98 is reverse biased and the transistor 98 accordingly is nonconductive, while the capacitor is charged from its preset voltage. Accordingly, the capacitor 54 is charged through resistor 52 until the preselected voltage level, which is somewhat in excess of the 10 volt voltage level set by the potentiometer 58 is developed across capacitor 54, after the preselected time interval.

When transistor 108 is rendered conductive, an output signal is produced at its emitter. This output signal is supplied to an emitter output resistor 116 connected to the emitter 114 of transistor 108 and an output voltage signal appears across this resistor. Resistor 116 is also connected to the input of the output transistor 62, as shown, and this output signal is applied across the base-emitter junction of output transistor 62, which preferably comprises a normally nonconductive NPN transistor. Consequently, this output signal forward biases the base-emitter junction of output transistor 62 rendering this transistor conductive. Since the transistor 62 is serially connected to switch means 64 and further, since transistor 62 and switch means 64 are connected across potentiometer 58, when transistor 62 is rendered conductive the potentiometer 58 is shunted, and a signal is supplied through the switch means 64. In this regard the switch means 64 preferably comprises a reed switch in order to provide improved noise suppression, as well as to provide improved isolation between the input and output of the time delay circuit. The reed switch 64, which is energized as a result of connection of transistor 62, effects the closure of a pair of normally open relay contacts 118 operatively connected to the energizing coil of the reed switch, and, hence an output signal appears across the output terminals 34, 36, which are coupled to the contacts 118. In addition, in view of the previously described latch function, the preset voltage level is continually maintained across capacitor 54 and transistor 98 remains conductive subsequent to the discharge of capacitor 54 so that it continues to supply a signal to transistor 108, which in turn, results in a signal being continually supplied to output switch transistor 62. Hence, the reed switch 64 remains energized and the contacts 118 remain closed to assure the maintenance of a signal across output terminals 34, 36, and the output signal is supplied at the output terminals 34, 36 until the time delay circuit 10 is deenergized by opening of the input switch 32.

Figure 3:
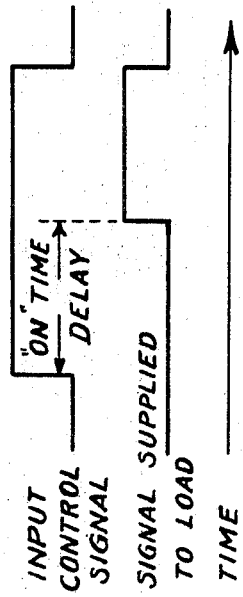
FIG. 3 is a diagram illustrating the operation of the ON delay circuit illustrated in FIG. 2.

As previously explained, the output signal does not appear at the output terminals 34, 36 until after a predetermined time interval subsequent to the initiation of the control signal which effects closing of the input switch means 32. This is shown in detail referring to FIG. 3, which diagrammatically illustrates the operation of the ON delay circuit of FIG. 2. More particularly, the input control signal is shown starting from an initial level and rising abruptly to a preselected voltage level along a horizontal time axis. Similarly, the signal which is supplied to the load is shown on starting from an initial level, but not rising to a preselected voltage level in response to the input control signal until after a time interval determined by the voltage level set by the potentiometer 58. In addition, it may be seen from FIG. 3 that upon completion of the cycle, when the circuit is deenergized and the control signal returns to its initial level, the signal being supplied to the load also substantially simultaneously returns to its previous initial level.

Referring now in detail to FIG. 4, a partially diagrammatic schematic circuit diagram of a power control system similar to that illustrated in FIG. 1 is shown, but including an OFF time delay circuit 120 coupled between an input switch branch 122 and output switch branch 124, which controls the power being supplied to a load 125. Operation of this power control system is somewhat similar to that illustrated in FIG. 1 but the OFF time delay circuit 120 is arranged to disrupt the power being supplied to the load at a predetermined time interval after deenergization of the input switch branch 122. More particularly, a pair of power terminals 126 and 128 are coupled to a suitable power supply (not shown) for supplying power to the power control system. In the embodiment illustrated in FIG. 4 the input switch branch 122 includes a suitable AC power switch 130, such as a triac, having a gate terminal 132, which is connected to an input switch means 134 through a gate resistor 136, as shown. When the input switch means 134 is closed in response to an appropriate signal from an input source (not shown), a signal is applied to the gate terminal 132 of the triac 130 so as to render the triac conductive. Accordingly, a signal is supplied across the power terminals of the triac and through a selectively energizable relay coil 136, which is serially connected to the triac power terminals. The selectively energizable relay coil 136 is operatively connected to a pair of relay contacts 138 arranged at the input of the time delay circuit 120. Operation of the relay contacts 138 is controlled in response to energization of the relay coil 136 so as to provide a control signal for initiating operation of the time delay circuit 120. The time delay circuit 120, as will be subsequently explained, is preferably arranged such that upon closure of the input switch means 138 the circuit is essentially instantaneously energized to provide an output signal, while upon opening of switch means 138, the output signal is not removed until the expiration of a preselected time interval. In this connection, the time delay circuit 120 includes a pair of output terminals 140 and 142, with output terminal 142 being directly connected to the output switch branch 124.

The output switch branch 124 includes a suitable AC power switch 144, such as a triac, having a gate electrode 146, coupled to the output terminal 142 through a gate resistor 148. In addition, the triac power terminals are serially connected to a selectively energizable relay coil 150, which is operatively connected to a pair of relay contacts 152, arranged as shown, preferably coupled to the output terminals of time delay circuit 120. In addition, the relay coil 150 is serially connected to a load branch 153, including an AC power switch 154, such as a triac, having a gate electrode 155. The load branch 153 also includes a switch means 156, such as a pair of relay contacts operatively connected to the relay coil 150. Operation of the relay contacts 156 is controlled by the relay coil 150, while the relay contacts 156 are connected to the gate electrodes 155 through a gate resistor 157 and thus control the conduction of the triac 154. The load 125 is serially connected to the power terminals of triac 154 and thus, the power supplied to the load 125 is controlled in response to opening and closing of relay contacts 156. More particularly, as will be subsequently explained in detail, when the time delay circuit 120 is energized, initiated by closing the input switch means 138, the triac 144 is rendered conductive at a positive half cycle of applied AC power, and a signal is supplied through the selectively energizable relay coil 150, thereby controlling operation of the contacts 156 and controlling the power supplied to the load 125. Thus, power may be supplied to the load 125 essentially instantaneously upon energization of the time delay circuit 120. When it is desired to disrupt the power being supplied to the load, operation of the time delay circuit is initiated by opening the switch 138, however, the output signal is not removed from the gate electrode 146 of the triac 144 to render the triac 144 nonconductive until after a preselected time. Upon expiration of this time interval, triac 144 is rendered nonconductive, and power is no longer supplied to the relay coil 150 which effects disruption of the power signal to the load 125.

Referring to FIG. 5, operation of the OFF time delay circuit 120 will now be explained in detail. The AC operating power is supplied between the power supply terminals 126 and 128 as illustrated, to a power supply network 160 through a rectifying diode 162. The rectifying diode is coupled to the power supply network 160 through a plurality of voltage dropping resistors 164, 166, and 168. These resistors are serially connected with each other and couple the rectifying diode 162 to a voltage regulating diode 170, such as a Zener diode, which provides a constant DC reference voltage across the output terminals of the power supply network 160 upon energization by the rectifying diode 162. In addition, a pair of parallel connected filter capacitors 172 and 174 are connected across the Zener diode 170 in order to filter the half-wave rectified signal being supplied thereto by the rectifying diode 162. In the illustrated embodiment, the switch 138 is in an open position, but the DC reference voltage is applied to a switch output branch 176, which is maintained in a conductive state by the power supply network 160. The switch output branch 176 includes an NPN switch transistor 178, having a base 180, a collector 182, and an emitter 184, and also includes a selectively energizable switch 186, preferably comprising a reed relay operatively coupled to a pair of contacts 188, connected to output terminals 140, as shown, so as to provide an output signal at the output terminals 140 upon closure. In addition, a collector bias resistor 190 is provided connected across the collector-base junction of transistor 178 and across the reed switch 186. Similarly, an emitter bias resistor 192 is connected across the base-emitter junction of transistor 192. Thus, when AC power is applied across terminals 126 and 128 to effect the production of the DC reference potential by power supply network 160, the transistor 178 is rendered conductive, relay 186 is energized and contacts 188 are closed.

To initiate operation of the time delay circuit 120, switch 138 is initially closed which assures closing of contacts 188 if previously open, and causes triac 144 to fire on the next positive half cycle of applied AC power. In this connection, a triggering signal is supplied through switch 138, an isolation diode 194, and terminal 142 to effect firing of triac 144 upon closure of switch 138. As a result relay coil 150 is energized, which in the illustrated embodiment, effects closure of contacts 156 and firing of triac 154, thereby supplying power to load 125. In addition, energization of coil 150 effects closure of contacts 152, while contacts 188 remain closed until opened by operation of the time delay circuit 120, thereby assuring the maintenance of triac 144 in a conductive state until contacts 188 are caused to open in a manner hereinafter explained.

In this regard, on order to disrupt the signal being applied to the gate 146 of the triac 144 as to render the triac nonconductive and disrupt the flow of power to the load 125 it is necessary to open the input switch 138 and permit expiration of the predetermined time delay prior to disruption of the gate signal, whereupon triac 144 is rendered nonconductive when the applied AC signal passes through a zero level.

The OFF time delay circuit 120 includes a pedestal network 195, coupled to a time delay network 198, including an interconnected capacitor 200 and a resistor 202. Desired operation of the pedestal network 195 is assured by providing an isolation diode 204 connected between the common junction of the capacitor 200 and resistor 202 of the time delay network 198 and the switch 138. Diode 204 isolates the capacitor 200 from the applied AC voltage and also prevents any voltage buildup across the capacitor 200 while switch 138 is in a closed position by effectively shunting the capacitor as long as switch 138 remains closed. The pedestal network 195 is connected to the common junction of the capacitor 200 and resistor 202 and is arranged to establish a preset voltage level across the capacitor 200 upon entering of switch 138. In this connection, the pedestal network 195 includes a voltage divider configuration comprising resistors 206 and 208 connected across the Zener diode 170. The pedestal network 195 further includes a diode 210 which connects the common terminal of the voltage divider configuration to the common junction of the interconnected capacitor 200 and resistor 202 of the time delay network 198. The voltage divider is arranged to supply an appropriate voltage level to diode 210 so as to forward bias the diode 210 and charge the capacitor 200 to the preset voltage level, when switch 138 is open. In addition, diode 210 is arranged such that it is rendered nonconductive when the preset voltage level is established across capacitor 200, so that capacitor 200 is not charged in excess of the preset voltage level by the pedestal network 195.

A switching network 211 is coupled to the time delay network 198 and is maintained in a nonconductive state until a preselected voltage is established across capacitor 200 subsequent to opening of switch 138, whereupon the switching network 211 is rendered conductive and provides a discharge path for the capacitor 200. The switching network includes a normally nonconductive PNP transistor 212 coupled to the capacitor 200 and also connected to a normally nonconductive NPN transistor 214. The transistor 212 and the transistor 214, when rendered conductive in response to the establishment of the preselected voltage level across the capacitor 200, define the discharge path for the capacitor 200. In addition, the output of the transistor 214 if coupled to a normally nonconductive NPN shunt transistor 215 which is rendered conductive by an output signal produced in response to conduction of the transistor 214. When the shunt transistor 215 is rendered conductive it functions to shunt the base-emitter junction of the output transistor 178, rendering the transistor 178 nonconductive. Consequently, relay switch 186, which is serially connected to output transistor 178 is deenergized and the contacts 188 are opened, which results in the removal of the signal from output terminal 140, and in turn causes the gating signal to be removed from the gate 146 of triac 144 (assuming the switch 138 remains open). As a result, triac 144 is rendered nonconductive which disrupts the power being supplied to the relay coil 150, thereby effecting opening of contacts 156, so as to render triac 154 nonconductive and disrupt the power being supplied to the load 125.

More particularly, the PNP transistor 212 includes base electrode 216, a collector electrode 218, and an emitter electrode 220, and is maintained normally nonconductive until the preselected voltage level is established across the capacitor 200. In this connection, the transistor 212 is biased by a potentiometer 222, having an adjustable tap 223 coupled to its base electrode 216, while the emitter electrode 220 is connected to the capacitor 200. The potentiometer 222 is coupled to the DC reference potential, as shown, and is set to a predetermined voltage level in excess of the preset voltage level initially provided across the capacitor 200 by the pedestal network 195, but slightly less than the preselected voltage level to be established across the capacitor. The potentiometer 222, thus maintains the base emitter-junction of transistor 212 reverse biased until the voltage level at emitter 220, which is coupled to the capacitor 200 exceeds the voltage level set by the potentiometer as the capacitor 200 is charged through resistor 202, whereupon the transistor 212 becomes conductive and provides a discharge path for capacitor 200. Accordingly, it may be seen that the voltage setting of the potentiometer controls the voltage level established across the capacitor 200. Furthermore, the voltage setting of the potentiometer controls the time interval required for the capacitor 200 to be charged to the preselected voltage level. The transistor 214 includes a base 224 coupled to the collector 218 of transistor 216, and also includes a collector 226, which is coupled to the potentiometer 222, and an emitter 228 which is coupled to an output resistor 230. When transistor 214 is rendered conductive in response to the application of a base signal supplied due to conduction of the transistor 212 a sufficient voltage level is developed across output resistor 230 in response to conduction of transitor 214 ro effect forward biasing of the base-emitter junction of shunt transistor 215 which results in deenergization of relay 186, as previously explained.

In operation of the time delay circuit 120, a cycle of operation for effecting operation may be initiated by initially closing switch 138 which results in essentially instantaneous supply of power to the load 125, as previously explained. In addition, substantially complete discharge of the capacitor 200 is effected through diode 204 and the closed switch 138. In order to disrupt the power being supplied to the load, the switch 138 is opened and the pedestal network 195 effects charging of capacitor 200 through resistor 206 and diode 210 until the preset voltage level is established across capacitor 200 which causes diode 210 to become reverse biased, and permits the capacitor 200 to be charged through resistor 202 to the preselected voltage level which is in excess of the preset pedestal voltage level. This preselected voltage level is somewhat in excess of the voltage set by potentiometer 222 and causes the base-emitter junction of transistor 212 to become forward biased, since the voltage at the emitter 220 becomes more positive than the voltage at the base 216, which renders transistors 212 conductive. The preselected voltage level and the time interval required for charging capacitor 200 to this level is controlled by the setting of potentiometer 222, as previously explained. In one example, the preset voltage level is approximately 2.5 volts and the preselected voltage level is 10 volts. As a result of this conduction of transistor 212, an output signal appears across its collector 218 and this signal is supplied to the base 224 of transistor 214, since the base 224 is directly coupled to the collector 218. Thus, transistor 214 is rendered conductive and an output signal appears across the output resistor 230 connected to the emitter 228 of transistor 214. In addition, a low resistance discharge path for capacitor 200 is provided through transistor 212 and 214, which rapidly go into saturation. The output signal across resistor 230 is supplied to NPN shunt transistor 215 and forward biases the base-emitter junction of transistor 215, thereby rendering transistor 215 conductive, and causing transistor 215 to conduct more heavily as transistors 212 and 214 conduct more heavily. As illustrated, the collector-emitter circuit of transistor 215 is connected directly across the base-emitter junction of transistor 178. Consequently, when transistor 215 is rendered conductive, it shunts the bias resistor 192 which is connected across the base-emitter junction of transistor 178, thereby removing the base-emitter bias from transistor 178, causing transistor 178 to become nonconductive. Thus, it may be seen that upon initiation of discharge of capacitor 200 a discharge path is provided by the transistors 212 and 214, which causes the shunt transistor 215 to remove the bias from transistors 178, rendering the latter nonconductive. In addition, subsequent to the discharge, while switch 138 remains open, a signal is supplied through resistor 206 and diode 210 to the emitter 220 of transistor 212 which is sufficient to maintain transistor 212 conductive. Accordingly, transistor 214 and transistor 215 are similarly maintained conductive to assure that transistor 178 is maintained nonconductive.

As a result of the nonconduction of transistor 178, the energizing signal supplied through reed switch 186, which is serially connected to transistors 178, is removed and the output contacts 188, which are controlled by reed switch 186 are opened, thereby removing the output signal from the output terminal 140. Since switch 138 is open, when the output signal is removed from output terminal 140 a gating signal is no longer applied to triac 144. Thus, triac 144 is rendered nonconductive when the applied AC voltage passes through a zero level, and power is no longer supplied to relay coil 150. In addition, when relay coil 150 is deenergized opening of contacts 156 is effected in the illustrated embodiment, thereby removing the gate signal from triac 154 which is similarly rendered nonconductive, when the applied AC voltage passes through a zero level, thereby disrupting the power supplied to the load 125. The time delay circuit 120 is hence prepared for a subsequent cycle of operation which is initiated by closing and then opening the switch 138 as previously explained.

Referring to FIG. 6, a diagrammatic illustration is provided, describing the operation of the OFF time delay circuit 120. More particularly, as illustrated, an input signal is supplied to energize the time delay circuit, the input signal being illustrated as a pulse, which rapidly rises and remains at a particular level when switch 138 is closed, but then falls, when the switch 138 is opened to deenergize the circuit. The OFF time delay interval is illustrated extending from the termination or return of the input control signal to its initial level upon opening of switch 138 which initiates the timing function. The signal supplied to the load is established simultaneously with the establishment of the input control signal, but continues subsequent to the opening of the switch 138 until the expiration of the time delay provided by the OFF time delay circuit, as determining by the setting of potentiometer 222, whereupon the signal supplied to the load returns to its initial level, corresponding to the disruption of power to the load.

Thus, several novel time delay circuits have been described which are particularly adapted for use in power control systems for controlling the power being supplied to a load. The disclosed time delay circuits may be arranged to provide a preselected time interval between energization thereof by an input signal and the supply of a power signal to a load or, alternatively, may be arranged to immediately supply power to a load upon energization but to afford a preselected time delay between the deenergization of the time delay circuit and disruption of a power signal to the load.

Various changes and modifications in the described embodiments will be readily apparent to one skilled in the art and such changes and modifications are deemed to be within the spirit and scope of the invention as set forth in the appended claims.

We claim:

1. In a power control system for providing a power signal which varies in response to an input signal so as to control the power being supplied to a load, a time delay circuit for effecting a predetermined time delay between initiation of the input signal and the signal supplying power to the load, said time delay circuit comprising:

a time delay network including an interconnected resistor and capacitor, means coupled to said capacitor for maintaining a preset voltage thereacross at the initiation of a charging cycle and at the completion of a discharging cycle, means coupled to said time delay network for charging said capacitor in response to initiation of the input signal until a preselected voltage level in excess of said preset level appears across said capacitor in a predetermined time interval, said predetermined time interval varying in response to the value of said preselected voltage level, voltage sensitive switch means coupled to said capacitor, said voltage sensitive switch means being rendered conductive in response to the establishment of said preselected voltage level to provide a discharge path for said capacitor, a selectively adjustable bias means coupled to said voltage sensitive switch means for controlling the conduction of said voltage sensitive switch means by maintaining said voltage sensitive switch means in a nonconductive state until said preselected voltage level is established across said capacitor so as to control said predetermined time interval in response to the adjustment of said selectively adjustable bias means, means coupled to said capacitor discharge path to provide an output signal in response to the discharge of said capacitor upon the expiration of said predetermined time interval, output switch means coupled to the load, and means for coupling said output signal to said output switch means so as to control the conduction of said output switch means and thereby control the supply of power to the load.

2. In a power control system in accordance with claim 1 wherein said voltage sensitive switch means comprises a first transistor having a base, collector, and emitter, said selectively adjustable bias means being coupled to said base of said first transistor for maintaining said first transistor nonconductive during said predetermined time interval set by the adjustment of said selectively adjustable bias means, a second transistor having a base, collector, and emitter, said second transistor being coupled to said first transistor and being rendered conductive in response to conduction of said first transistor, and an output resistor connected to said second transistor for providing an output voltage signal in response to conduction of said second transistor, wherein means are coupled to said first transistor for supplying a latching signal subsequent to the discharge of said capacitor for maintaining said first transistor in a conductive state until said output switch means is rendered nonconductive, and wherein said output switch means includes a shunt transistor connected to said output resistor and adapted to be rendered conductive in response to said output voltage signal.

3. In a power control system in accordance with claim 2 wherein a reed relay switch is provided coupled to said shunt transistor, said reed relays switch including a pair of contacts operatively connected thereto and being adapted to control the supply of power to the load.

4. In a power control system in accordance with claim 2 wherein said first transistor comprises a PNP transistor having its emitter coupled to said capacitor so that the level of the bias voltage maintained at its base in response to the selected adjustment of said selectively adjustable bias means controls the value of the preselected voltage level established across the capacitor for initiating conduction of said first transistor, said first transistor having its collector coupled to the base of said second transistor so as to supply a base signal thereto, said second transistor comprises an NPN transistor having its collector coupled to said bias means and having its emitter coupled to said output resistor, said output switch means includes a selectively energizable switch, and said shunt transistor comprises an NPN transistor having its base emitter junction connected across said output resistor and having its collector connected to said selectively energizable switch so as to control the operation of said selectively energizable switch in response to conduction of said NPN shunt transistor.

5. A time delay circuit for effecting a predetermined time delay between an input signal and the initiation of an output signal which controls the power being supplied to a load comprising:

an interconnected resistor and capacitor comprising a time delay network, said capacitor being adapted to be charged to a preselected voltage level, a pedestal network coupled to said time delay network for establishing a preset voltage across said capacitor at the initiation of a charging cycle and at the completion of a discharging cycle, an input switch means coupled to said time delay network for initiating a charging cycle and a discharging cycle in a preselected time interval upon closure thereof in response to the input signal, said preselected time interval varying in response to the value of said preselected voltage level, a voltage sensitive switch transistor coupled to said capacitor, said voltage sensitive switch transistor being rendered conductive in response to the establishment of said preselected voltage level across said capacitor so as to comprise a portion of a discharge path for said capacitor, selectively adjustable means coupled to said voltage sensitive switch transistor and to said capacitor for biasing said voltage sensitive switch transistor so as to selectively adjust the value of said preselected voltage level to which said capacitor is charged and so as to selectively control said predetermined time interval in accordance with the selected value of said preselected voltage level, a current responsive switch transistor coupled to said voltage sensitive switch transistor, said current responsive switch transistor being rendered conductive in response to conduction of said voltage sensitive switch transistor and comprising another portion of the discharge path for said capacitor, an output switch transistor coupled to said current responsive switch transistor, said output switch transistor being rendered conductive in response to conduction of said current responsive transistor, a selectively energizable relay connected to said output transistor, said relay including a relay coil serially connected to said output transistor and including a pair of contacts which upon closure in response to energization of said relay coil initiates the supply of power to the load.

6. A time delay circuit for effecting a predetermined time delay between the initiation of an input signal and the production of an output signal which controls the power being supplied to a load comprising:

an interconnected resistor and capacitor comprising a time delay network, said capacitor being adapted to be charged to a preselected voltage level in a predetermined time interval, a pedestal network coupled to said time delay network for establishing a preset voltage across said capacitor prior to the initiation of a charging cycle and at the completion of a discharging cycle, means coupled to said time delay network for initiating charging of said capacitor to said preselected voltage level, a voltage sensitive switch transistor coupled to said capacitor, said voltage sensitive switch transistor being rendered conductive in response to the establishment of said preselected voltage level across said capacitor so as to comprise a portion of a discharge path for said capacitor, means for controlling the magnitude of said preselected voltage level including a selectively adjustable bias means coupled to said voltage sensitive switch transistor for adjusting the voltage level at which said voltage sensitive switch transistor is rendered conductive so as to control the magnitude of said preselected voltage level and thereby control said time interval required for said capacitor to be charged to said preselected voltage level, an energizing transitor coupled to said voltage sensitive switch transistor, said energizing transistor being rendered conductive in response to conduction of said voltage sensitive switch transistor and comprising another portion of the discharge path for said capacitor, a shunt transistor coupled to said energizing transistor, said shunt transitor being rendered conductive in response to conduction of said energizing transistor, a switch transistor having its input connected across the output of said shunt transistor in a manner so that conduction of said shunt transistor is effective to shunt the input of said switch transistor and render said switch transistor nonconductive in response to conduction of said shunt transistor, a selectively energizable relay connected to said switch transistor, said relay including a relay coil serially connected to said switch transistor and including a pair of contacts which, upon opening in response to deenergization of said relay coil as a result of nonconduction of said switch transistor, initiate the disruption of the supply of power to the load.